United States Patent
Lee et al.

(10) Patent No.: US 9,830,911 B2
(45) Date of Patent: Nov. 28, 2017

(54) ELECTRONIC APPARATUS AND VOICE PROCESSING METHOD THEREOF

(71) Applicant: SAMSUNG ELECTRONICS CO., LTD., Suwon-si (KR)

(72) Inventors: Joo-yeong Lee, Yongin-si (KR); Sang-shin Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 159 days.

(21) Appl. No.: 14/072,853

(22) Filed: Nov. 6, 2013

(65) Prior Publication Data
US 2014/0207470 A1    Jul. 24, 2014

(30) Foreign Application Priority Data
Jan. 22, 2013  (KR) .................. 10-2013-0007032

(51) Int. Cl.
*G10L 15/22*    (2006.01)
*G10L 15/30*    (2013.01)

(52) U.S. Cl.
CPC ........ *G10L 15/30* (2013.01); *G10L 2015/223* (2013.01)

(58) Field of Classification Search
USPC .................. 704/200, 231–257, 270–275, 704/E15.01–E15.05
See application file for complete search history.

(56) References Cited

U.S. PATENT DOCUMENTS 4,703,504 A * 10/1987 Vittorelli ................. G10L 15/10
                                                          704/254
4,827,520 A *  5/1989 Zeinstra .............. B60R 16/0373
                                                          701/1
(Continued)

FOREIGN PATENT DOCUMENTS

| EP | 2725577 A2 | 4/2014 |
|---|---|---|
| WO | 01/26349 A1 | 4/2001 |
| WO | 2014/055076 A1 | 4/2014 |

OTHER PUBLICATIONS

Communication dated Jan. 30, 2014, issued by the European Patent Office in counterpart European Application No. 13190415.3.

(Continued)

*Primary Examiner* — Jialong He
(74) *Attorney, Agent, or Firm* — Sughrue Mion, PLLC

(57) ABSTRACT

Apparatuses and methods related an electronic apparatus and a voice processing method thereof are provided. More particularly, the apparatuses and methods relate to an electronic apparatus capable of recognizing a user's voice and a voice processing method thereof. An electronic apparatus includes: a voice recognizer configured to recognize a user's voice; a storage configured to have previously stored instructions; a function executor which performs a predetermined function; and a controller configured to control the function executor to execute the function in response to the instruction in response to a user's voice corresponding to the instruction being input, and controls the function executor to execute the function in accordance with results of an external server which analyzes a user's voice in response to a preset dialog selection signal and a dialog voice for executing the function being input by a user.

13 Claims, 4 Drawing Sheets

(56) References Cited

U.S. PATENT DOCUMENTS

| | | | | |
|---|---|---|---|---|
| 5,748,841 A * | 5/1998 | Morin | | G06F 3/16 704/257 |
| 5,917,891 A * | 6/1999 | Will | | H04M 1/271 379/88.01 |
| 6,385,573 B1 * | 5/2002 | Gao | | G10L 19/005 704/219 |
| 6,513,009 B1 * | 1/2003 | Comerford | | G10L 15/22 704/270 |
| 6,560,576 B1 * | 5/2003 | Cohen | | G06F 3/167 704/270 |
| 6,757,365 B1 * | 6/2004 | Bogard | | H04L 51/04 379/88.17 |
| 7,027,991 B2 * | 4/2006 | Alexander | | G10L 15/26 704/257 |
| 7,120,234 B1 * | 10/2006 | Quinn | | H04M 1/2473 379/88.04 |
| 7,197,331 B2 * | 3/2007 | Anastasakos | | G10L 15/30 455/550.1 |
| 7,720,683 B1 * | 5/2010 | Vermeulen | | G10L 15/22 704/235 |
| 7,826,945 B2 * | 11/2010 | Zhang | | G06F 3/16 701/36 |
| 7,933,777 B2 * | 4/2011 | Koll | | G10L 15/32 370/353 |
| 8,032,383 B1 * | 10/2011 | Bhardwaj | | G10L 15/30 455/420 |
| 8,234,114 B2 | 7/2012 | Chang et al. | | |
| 8,326,634 B2 * | 12/2012 | Di Cristo | | G06F 17/279 704/257 |
| 2001/0041980 A1 * | 11/2001 | Howard | | G10L 15/1822 704/270 |
| 2002/0046023 A1 | 4/2002 | Fujii et al. | | |
| 2002/0091518 A1 * | 7/2002 | Baruch | | G10L 15/32 704/231 |
| 2002/0143551 A1 | 10/2002 | Sharma et al. | | |
| 2003/0028382 A1 * | 2/2003 | Chambers | | G10L 15/26 704/275 |
| 2003/0033146 A1 * | 2/2003 | Morin | | G10L 15/22 704/251 |
| 2003/0033152 A1 * | 2/2003 | Cameron | | G10L 15/26 704/275 |
| 2003/0065427 A1 * | 4/2003 | Funk | | G01C 21/3608 701/1 |
| 2003/0069731 A1 * | 4/2003 | Foucher | | H04M 3/493 704/251 |
| 2004/0075677 A1 * | 4/2004 | Loyall | | G10L 13/00 715/706 |
| 2004/0083099 A1 * | 4/2004 | Scarano | | G06F 17/30746 704/231 |
| 2004/0117179 A1 * | 6/2004 | Balasuriya | | G10L 15/32 704/231 |
| 2004/0117188 A1 * | 6/2004 | Kiecza | | G10L 25/78 704/270.1 |
| 2004/0128135 A1 * | 7/2004 | Anastasakos | | G10L 15/30 704/270.1 |
| 2004/0230637 A1 * | 11/2004 | Lecoueche | | G10L 15/20 709/200 |
| 2005/0033582 A1 * | 2/2005 | Gadd | | G06Q 30/02 704/277 |
| 2005/0108338 A1 * | 5/2005 | Simske | | G10L 15/26 709/206 |
| 2005/0177373 A1 * | 8/2005 | Cooper | | G10L 15/22 704/275 |
| 2007/0047719 A1 * | 3/2007 | Dhawan | | H04M 1/2478 379/235 |
| 2007/0265849 A1 * | 11/2007 | Grost | | G10L 15/32 704/257 |
| 2008/0059188 A1 * | 3/2008 | Konopka | | G10L 15/22 704/257 |
| 2008/0103781 A1 * | 5/2008 | Wasson | | G10L 17/26 704/277 |
| 2009/0204409 A1 * | 8/2009 | Mozer | | G10L 15/30 704/275 |
| 2009/0282371 A1 * | 11/2009 | Curl | | G06F 19/327 715/863 |
| 2012/0162540 A1 | 6/2012 | Ouchi et al. | | |
| 2012/0173244 A1 * | 7/2012 | Kwak | | G10L 15/22 704/275 |
| 2012/0209601 A1 * | 8/2012 | Jing | | G10L 21/0364 704/226 |
| 2012/0253823 A1 * | 10/2012 | Schalk | | G08G 1/096877 704/270.1 |
| 2012/0303371 A1 * | 11/2012 | Labsky | | G10L 13/08 704/260 |
| 2013/0132089 A1 * | 5/2013 | Fanty | | G10L 21/00 704/270 |
| 2013/0138444 A1 * | 5/2013 | George | | G06F 19/3418 704/275 |
| 2013/0289994 A1 * | 10/2013 | Newman | | G10L 15/22 704/254 |
| 2014/0095175 A1 * | 4/2014 | Lee et al. | | 704/275 |
| 2014/0122088 A1 * | 5/2014 | Lee | | G10L 15/00 704/275 |
| 2014/0122089 A1 * | 5/2014 | Lee et al. | | 704/275 |
| 2014/0200896 A1 * | 7/2014 | Lee et al. | | 704/270.1 |
| 2014/0207470 A1 * | 7/2014 | Lee et al. | | 704/275 |
| 2014/0350925 A1 * | 11/2014 | Park et al. | | 704/231 |

OTHER PUBLICATIONS

Communication issued Dec. 9, 2015, issued by the European Patent Office in counterpart European Patent Application No. 13190415.3.

* cited by examiner

ELECTRONIC APPARATUS AND VOICE PROCESSING METHOD THEREOF

CROSS-REFERENCE TO RELATED APPLICATION

This application claims priority from Korean Patent Application No. 10-2013-0007032, filed on Jan. 22, 2013 in the Korean Intellectual Property Office, the disclosure of which is incorporated herein by reference, in its entirety.

BACKGROUND

Field

Apparatuses and methods consistent with the exemplary embodiments relate to an electronic apparatus and a voice processing method thereof. More particularly, the exemplary embodiments relate to an electronic apparatus capable of recognizing a user's voice and a voice processing method thereof.

Description of the Related Art

In addition to recent various functions of audio/video (AV) apparatuses such as a blue-ray Disc® (BD)/digital versatile disc (DVD) player, as well as a television, functions of using a microphone for voice recognition to control the apparatus have been used beyond an input method employing an existing remote controller.

A voice recognition method includes a voice command processing method of recognizing a previously stored instruction, and a method of processing a dialogue voice of recognizing not the previously stored instruction, but rather recognizing the voice. For example, to turn up the volume of the electronic apparatus, the volume of the electronic apparatus may be controlled by a previously stored instruction of "volume up" or by dialogue voice recognition of processing voice of "increase the volume" having the same meaning as "volume up" but not stored. In the case of the dialogue voice recognition, an external voice recognition server is used to analyze a user's voice and determine the meaning of the voice.

Such two voice recognition systems has currently used a method in which a user's spoken voice is analyzed in the voice recognition server. A determination has been made whether there is a command mode process. In response to a spoken voice corresponding to a previously stored instruction, a relevant function is performed; otherwise, the spoken voice is processed by a dialog mode process.

In the foregoing method, when a user speaks dialogue voice, the spoken voice has to unconditionally undergo both a command mode process and a dialog mode process. However, this causes a problem with respect to the time taken in carrying out both the command mode process and the dialog mode process, and the inefficiency of operating the system where the instruction process is wastefully performed.

SUMMARY

One or more exemplary embodiments may provide an electronic apparatus and method of processing a voice processing method thereof, in which time delay is decreased and efficiency of the apparatus is enhanced, with regard to recognition of user's voice.

Also, another exemplary embodiment provides an electronic apparatus and method of processing a voice, in which user experience can be induced and increased with regard to recognition of user's voice.

The foregoing and/or other aspects of the present disclosure may be achieved by providing an electronic apparatus including: a voice recognizer configured to recognize a user's voice; a storage configured to previously store instructions; a function executor configured to perform a predetermined function; and a controller configured to control the function executor to execute the function in response to the instruction in response to a user's voice corresponding to the instruction being input, and is configured to control the function executor to execute the function in accordance with results of an external server analyzing a user's voice in response to a preset dialogue selection signal and a dialogue voice for executing the function being input by a user.

According to an aspect of another exemplary embodiment, the dialogue selection signal may include a user's voice signal.

According to an aspect of another exemplary embodiment, the electronic apparatus may further include a user input configured to include a toggle button.

The foregoing and/or other aspects of exemplary embodiments may be achieved by providing an electronic apparatus including: a voice recognizer configured to recognize a user's voice; a storage configured to previously store instructions; a function executor configured to perform a predetermined function; and a controller configured to process a user's voice through one of an instruction process in which the function is executed in accordance with the instruction corresponding to a user's voice and a dialogue process in which the function is executed in accordance with results of an external server analyzing a user's voice, based on a process selection signal input by a user, and configured to control the function executor to execute the function corresponding to the processed user's voice.

According to an aspect of another exemplary embodiment, the process selection signal may include a user's voice signal for selecting one of the instruction process and the dialogue process.

According to an aspect of another exemplary embodiment, the voice recognizer is configured to sequentially receive a user's voice which corresponds to the process selection signal and a user's voice for executing the function from a user.

The foregoing and/or other aspects of the exemplary embodiments may be achieved by providing a voice processing method of an electronic apparatus including a storage which previously stores an instruction, the method including: recognizing a user's voice; determining whether a preset dialogue selection signal is input; and executing a predetermined function in accordance with results of an external server analyzing the recognized user's voice in response to a determination that the dialogue selection signal is input, and executing the function in response to the instruction corresponding to a user's voice in response to a determination that the dialogue selection signal is not input.

According to an aspect of another exemplary embodiment, the dialogue selection signal may include a user's voice signal in selecting a dialogue process.

Another exemplary embodiment may provide an electronic apparatus including: a function executor configured to perform a predetermined function; and a controller configured to control the function executor to execute the function in response to instructions received in response to a user's voice corresponding to the instruction being input, and controls the function executor to execute the function in accordance with results of an external server analyzing a user's voice in response to a preset dialogue selection signal and a dialogue voice for executing the function being input by a user.

The electronic apparatus may further include: a voice recognizer configured to recognize a user's voice and a storage configured to have previously stored instructions. The dialogue selection signal may include a user's voice signal.

The electronic apparatus may further include a user input comprising a toggle button, wherein the dialogue selection signal is generated by the toggle button.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
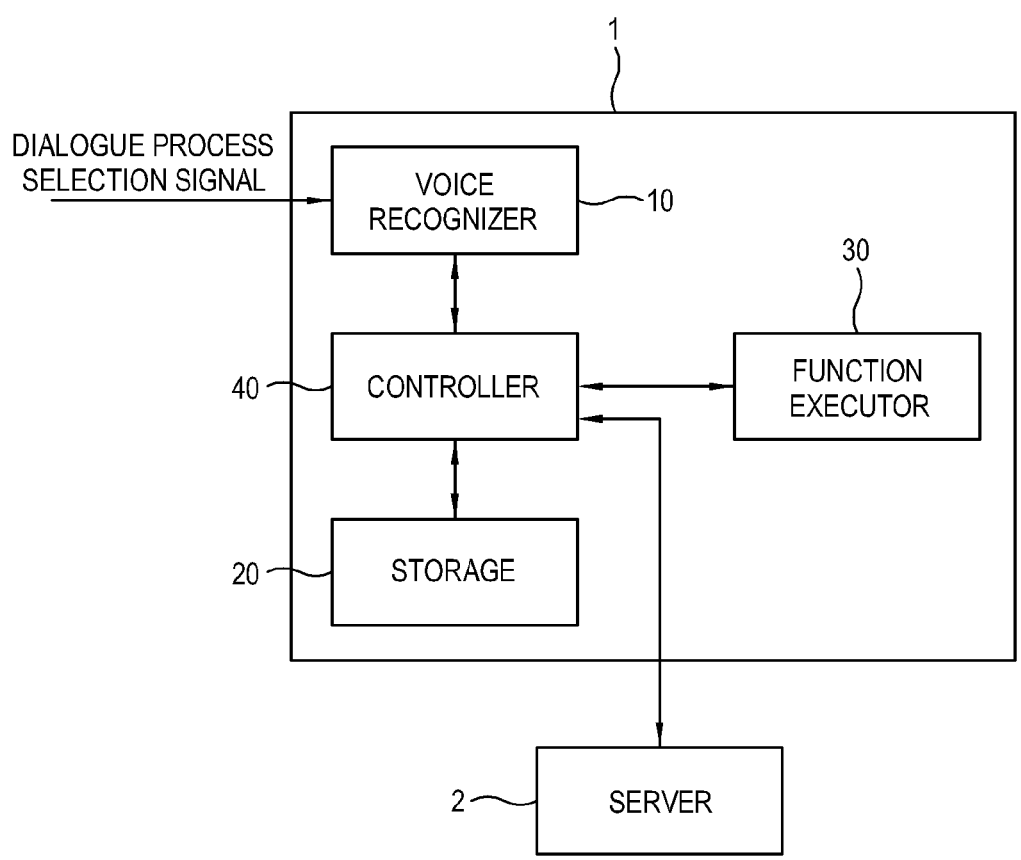
FIG. 1 is a control block diagram of an electronic apparatus according to an exemplary embodiment.

Below, exemplary embodiments will be described in detail with reference to accompanying drawings so as to be easily understood by a person having ordinary knowledge in the art. The exemplary embodiments may be embodied in various forms without being limited to the embodiments set forth herein. Descriptions of well-known parts are omitted for clarity, and like reference numerals refer to like elements throughout.

FIG. 1 is a control block diagram of an electronic apparatus according to an exemplary embodiment. In this exemplary embodiment, the electronic apparatus 1 may include a television, a computer system, a settop box, a Blue-ray Disc® (BD) player, a digital versatile disc (DVD) player, an MP3 player, an audio/video (AV) device which can reproduce voice and image files, or the like. The electronic apparatus 1 may be implemented as a personal digital assistant (PDA), a tablet computer, a household or mobile phone, etc., or may be implemented as home appliances such as a washing machine and a microwave oven. In this exemplary embodiment, the electronic apparatus 1 may recognize a user's voice and may perform various functions in accordance with a user's voice. To this end, the electronic apparatus 1 includes a voice recognizer 10, a storage 20, a function executor 30 and a controller 40.

The voice recognizer 10 includes a microphone which receives a user's voice or various sounds. The voice recognizer 10 extracts a user's voice from received sounds in response to receiving a user's voice, and converts the extracted user's voice into a machine language that can be processed by the electronic apparatus 1, thereby determining the meaning of the extracted user's voice. Also, in response to the recognized voice being for executing a function based on voice recognition, the voice recognizer 10 transmits to the controller 40 information related to the voice.

According to another exemplary embodiment, the electronic apparatus 1 may include only the microphone for receiving the voice, and may determine a user's voice through the external server that extracts voice by analyzing the received sound and determines the meaning of the voice.

The storage 20 stores instructions for executing various functions of the electronic apparatus 1, based on a user's voice. In response to the function of the electronic apparatus 1 being performed by input based on voice besides input based on a user's control using a key, a button, or a touch sensor, the previously set instructions for performing the functions are previously stored. For example, in response to the electronic apparatus 1 being a television, the instructions such as "volume up", "volume down", "channel change", "record start", etc. may be stored in the storage 20. In response to the recognized user's voice being matched to the instruction stored in the storage 20, the controller 40 carries out the function of the electronic apparatus 1 in accordance with the instruction. Thus, in response to receiving a user's voice which matches the instruction stored in the storage 20, the controller 40 which determine a voice recognition process which performs the function as an instruction process. In the case of the instruction process, in response to the received user's voice being mismatched to the stored instruction or has the same or similar meaning as voice corresponding to the stored instruction, the controller 40 do not carry out any function in accordance with the user's voice.

A user may directly input various instructions to the storage 20 or may change or delete instructions. Frequently used instructions are stored so that functions can be quickly and rapidly carried out.

The function executor 30 symbolically represents an executor corresponding to various functions that can be executed by the electronic apparatus 1. The function executor 30 may include any hardware or software necessary for carrying out various functions, and the functions may be performed not by a user's voice but rather by the direct control of a user.

The controller 40 controls a user's voice to undergo one of the instruction process and the dialogue process in response to receiving a recognition result of a user's voice from the voice recognizer 10, thereby operating the function executor 30. In the dialogue process, a user's voice is transmitted to the external server 2 and processed for carrying out a function based on analysis results from the server 2 in response to a user's voice not being matched to an instruction stored in the storage 20. For example, in response to a user inputting voice such as "could you turn up volume?" or "more loudly", which has similar meaning as the stored "volume up," instead of "volume up," the controller 40 transmits the recognized user's voice to the server 2, allows the server 2 to determine the meaning of the voice, and receives the determined result from the server 2. The server 2 determines a user's voice and transmits information related to one instruction from among the stored instructions or information related to an algorithm for performing the function to the electronic apparatus 1.

In this exemplary embodiment, the controller 40 uses one of the instruction process and the dialogue process to process a user's voice in accordance with a preset dialogue selection signal input by a user. That is, in response to a user inputting the dialogue selection signal for processing voice through the dialogue process, the controller 40 processes a user's voice through the dialogue process. On the other hand, in response to the dialogue selection signal not being input, a user's voice may be processed through the instruction process.

For example, in response to a user inputting a voice of "dialogue" and voice for executing a function, the controller 40 transmits the voice for executing the function to the server 2, thereby receiving analysis results from the server. In this case, the dialogue selection signal is a user's voice for selecting the dialogue process. In response to the dialogue selection signal being a user's voice, a user may set up various dialogue selection signals in accordance with his/her individual tastes. Thus, voice is input through the microphone and stored, so that the usability of the electronic apparatus 1 can be improved and a user can accumulate his/her experience of using the electronic apparatus 1.

As is known, when a user inputs voice, his/her voice is processed through the instruction process. At this time, in response to a user's voice not being matched with the stored instruction, the voice is processed again through the dialogue process. Under the known control, the instruction process has to be wastefully implemented even in response to a user's voice not being matched to an instruction, and therefore time is delayed while responding to a user's voice and wasteful control deteriorates mechanical efficiency.

In this exemplary embodiment, a user can input a signal for selecting the process along with voice for command if he/she wants to process his/her voice to be processed through the dialogue process. Therefore, the electronic apparatus 1 can more quickly and efficiently respond to a user's command. Furthermore, even though a user may not remember, one by one, a lot of instructions stored in the storage 20, a variety of verbalism can be used in order to carry out a function desired by a user.

In response to a user inputting only voice for carrying out a function without inputting the dialogue selection signal, the controller 40 processes a user's voice in accordance with the instruction process. At this time, in response to the voice input by a user not being matched with the stored instruction, the controller 40 switches to the dialogue process and processes a user's voice. This is because the function has to be implemented in accordance with a user's intention even though a user does not input the dialogue selection signal.

According to another exemplary embodiment, the controller 40 stores history and a record of a user's voice processed by the dialogue process. In response to a certain voice being repetitively input, this may be stored in the storage 20. In the case where the function is carried out through the instruction stored in the storage 20, it may be faster than that of using the external server 2 for carrying out the function. Therefore, a user's voice pattern is stored so as to induce the instruction process instead of the dialogue process. In this case, the controller 40 may inform a user through a graphic user interface (GUI) or the like that the instructions frequently used by a user are processed by not the dialogue process but the instruction process.

Figure 2:
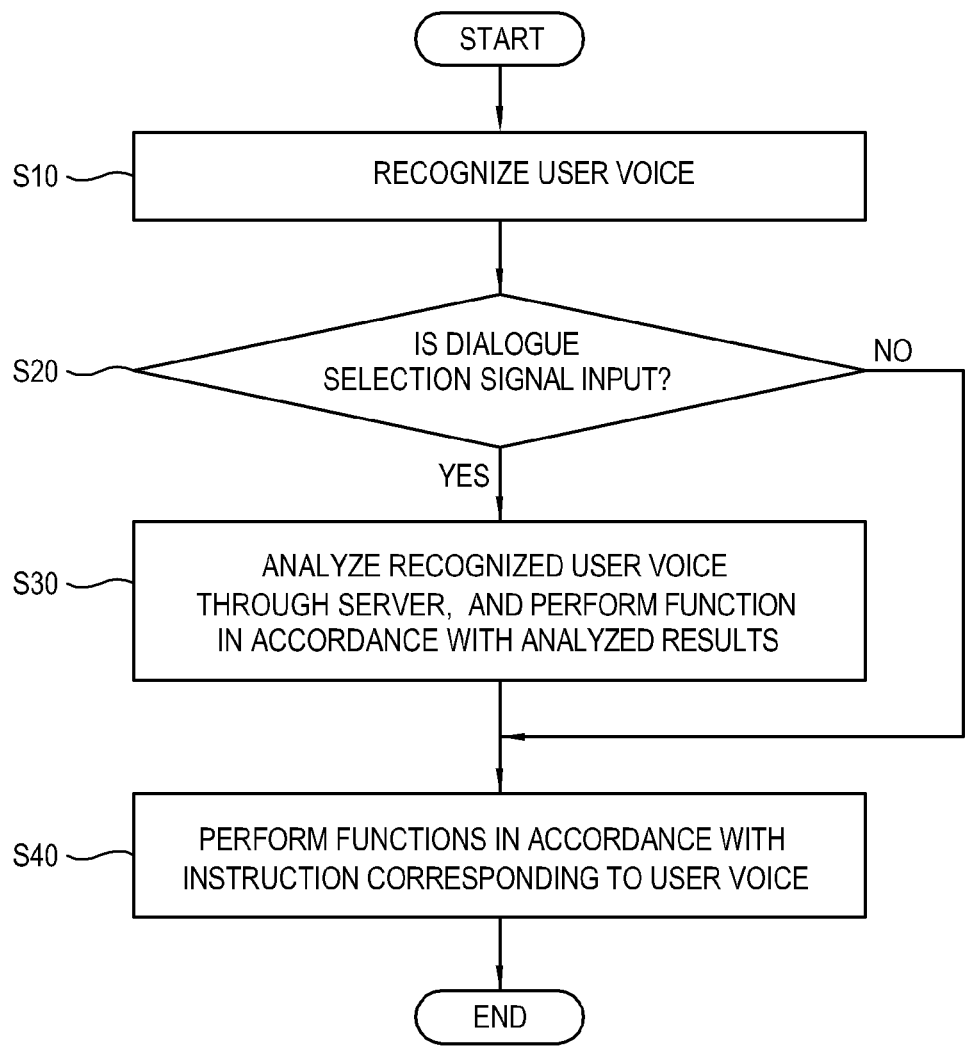
FIG. 2 is a control flowchart which explains a method of controlling an electronic apparatus according to an exemplary embodiment.

FIG. 2 is a control flowchart which explains a method of controlling an electronic apparatus according to an exemplary embodiment. Referring to FIG. 2, a voice processing method of the electronic apparatus according to an exemplary embodiment is as follows.

The electronic apparatus 1 receives a user's voice for executing a function from a user and recognizes the voice (S10).

The user's voice recognized by the voice recognizer 10 is transmitted to the controller 40, and the controller 40 determines whether the user's voice involves a preset dialogue selection signal, that is, whether or not the dialogue selection signal is input (S20).

In result, in response to a determination that the dialogue selection signal is being input, the controller 40 determines that the dialogue process is selected; requests an analysis of the recognized user's voice to the server 2; and executes the function of the electronic apparatus 1 in accordance with the analysis results received from the server 2 (S30).

On the other hand, in response to a determination that the dialogue selection signal is not input, the controller 40 determines that the instruction process is selected; and executes the function of the electronic apparatus 1 in accordance the instruction matching with a user's voice (S40).

Figure 3:
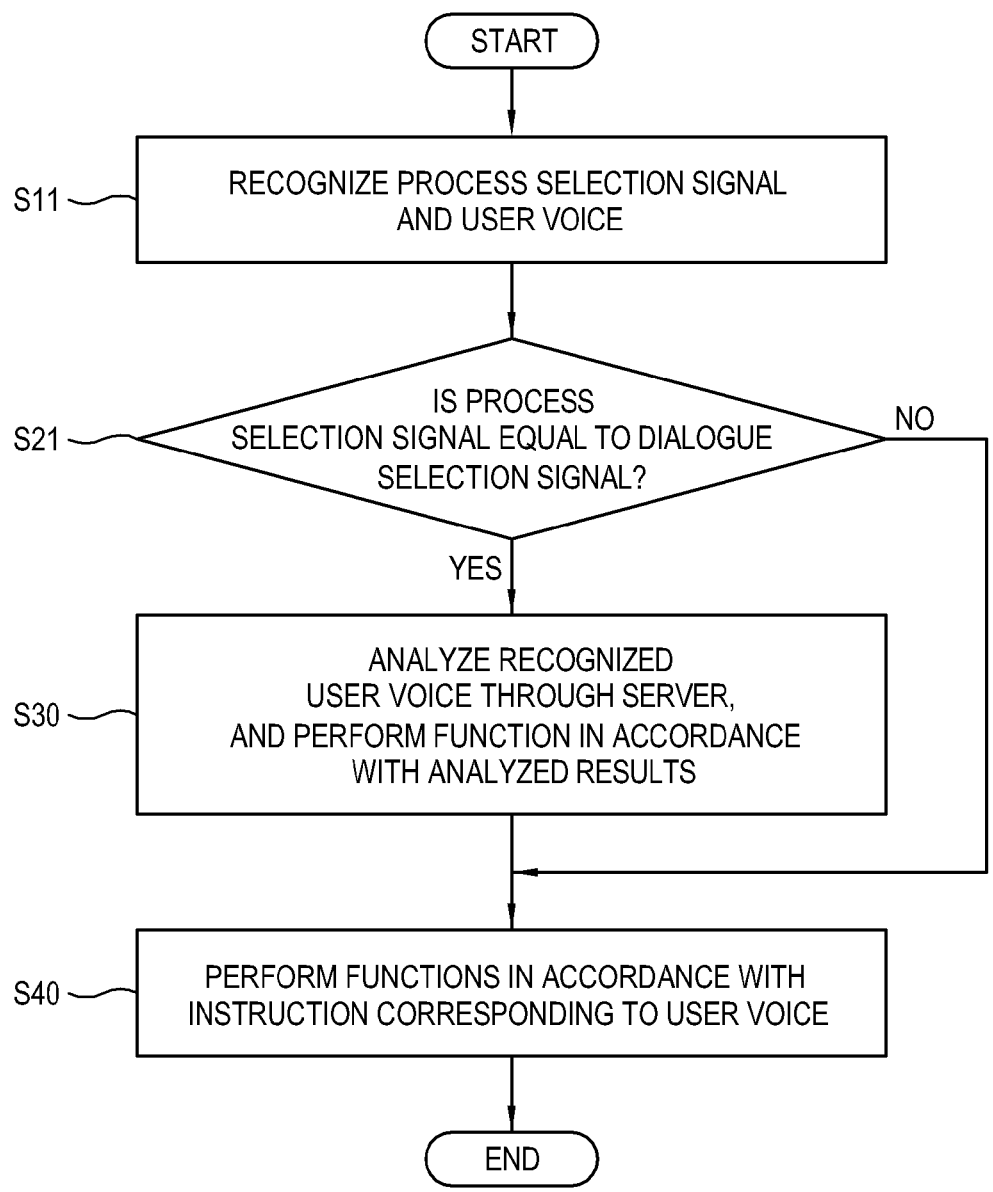
FIG. 3 is a control flowchart which explains a method of controlling an electronic apparatus according to another exemplary embodiment.

FIG. 3 is a control flowchart which explains a method of controlling an electronic apparatus according to another exemplary embodiment. In this exemplary embodiment, the controller 40 uses one of the instruction process executing the function in accordance with the instruction from the external server 2 matching a user's voice and the dialogue process executing the function in accordance with an analysis result of a user's voice based on a selection signal for selecting the dialogue process or the instruction process, so as to process a user's voice, and controls the function executor 30 to execute the function corresponding to the processed user's voice. That is, the electronic apparatus 1, according to an exemplary embodiment receives a selection signal from a user for clearly selecting the instruction process or the dialogue process.

As shown in FIG. 3, according to an exemplary embodiment, a user inputs a process selection signal for selecting the process along with voice for executing a function to the electronic apparatus 1 (S11). Such a process selection signal may include a user's voice for selecting one of the instruction process and the dialogue process. In this case, the voice recognizer 10 receives a user's voice for selecting the process and a user's voice for executing a function in sequence.

The controller 40 determines whether the process selection signal input by a user is a dialogue selection signal or an instruction selection signal (S21).

In result, in response to the process selection signal being the dialogue selection signal, as shown in S30 of FIG. 2, the controller 40 analyzes the recognized user's voice through the server 2 and carries out the function of the electronic apparatus 1 in accordance with the analysis results (S30).

Likewise, in response to the process selection signal not being the dialogue selection signal but rather the instruction selection signal, the controller 40 determines that the instruction process is selected, and carries out the function of the electronic apparatus 1 in accordance with an instruction matching the user's voice (S40).

Figure 4:
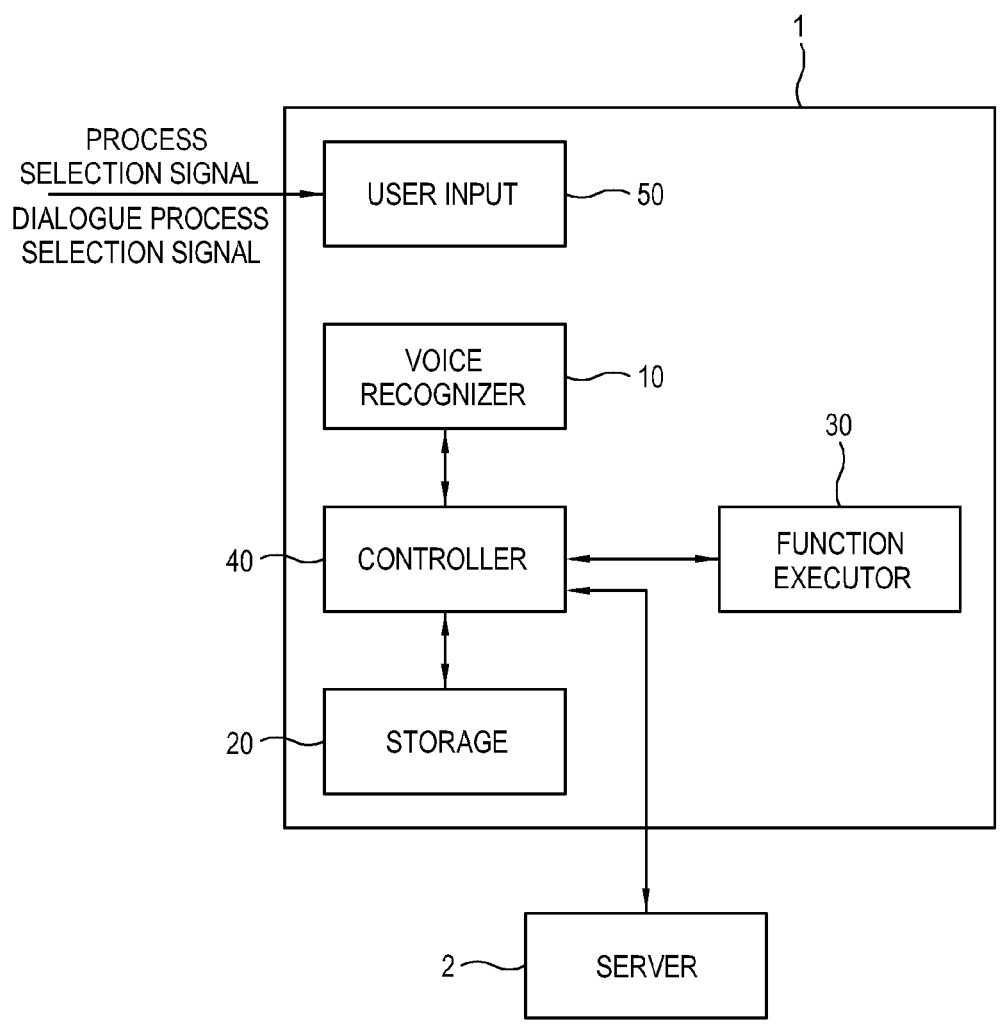
FIG. 4 is a control block diagram of an electronic apparatus according to an exemplary embodiment.

FIG. 4 is a control block diagram of an electronic apparatus according to an exemplary embodiment. As shown therein, the electronic apparatus 1 in this embodiment further includes a user input 50. The user input 50 may include a toggle button 51, and may further include a touch sensor such as a touch pad. A user may control the toggle button 51 to generate the dialogue selection signal or the process selection signal. That is, a user may use the toggle button 51 to select a process for a user's voice recognition. In response to a user wanting to execute the function of the electronic apparatus 1 through his/her voice, he/she may activate or inactivate the toggle button 51, thereby selecting one of the instruction process and the dialogue process. Alternatively, Further, a user's favorite process may be set up while the toggle button 51 is activated, and it is therefore convenient for a user to execute the function though his/her voice.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electronic apparatus comprising:
a voice recognizer configured to recognize a user's voice;
a storage configured to have previously stored instructions;
a function executor configured to perform a predetermined function; and
a controller configured to:
   make a first determination whether or not the user's voice comprises a voice selection command for using a dialogue mode;
   in response to the first determination that the user's voice comprises the voice selection command, skip an instruction mode and provide voice following the voice selection command to an external server for external analyzing and based on results of the external server analyzing of the voice, control the function executor to execute the predetermined function, and
   in response to the first determination that the user's voice does not comprise the voice selection command, make a second determination whether the user's voice matches an instruction of the previously stored instructions, in response to the second determination indicating that the user's voice matches the instruction of the previously stored instructions, execute the instruction mode in which the user's voice is processed internally within the electronic apparatus and control the function executor to execute the predetermined function corresponding to the instruction, and in response to the second determination indicating that the user's voice does not match any of the previously stored instructions, provide the user's voice to the external server for external analyzing.

2. The electronic apparatus according to claim 1, wherein the instruction mode is a default mode of processing the voice in the electronic apparatus and wherein, in response to a selection of the dialogue mode via the voice selection command, the controller is further configured to switch from the default mode to the dialogue mode and skip the processing of the user's voice internally by the electronic apparatus.

3. The electronic apparatus according to claim 1, wherein, in response to a voice command being repetitively input, the controller is configured to store, in the storage, a record of the voice command processed by the dialogue mode, and
   wherein, in response to the controller determining that the user's voice corresponds to the voice command stored in the record, the controller executes the instruction mode instead of the dialogue mode.

4. An electronic apparatus comprising:
a voice recognizer configured to recognize a user's voice;
a storage configured to have previously stored instructions;
a function executor configured to perform a predetermined function; and
a controller configured to:
   make a first determination whether or not the user's voice comprises a voice selection command for using a dialogue process:
   in response to the first determination that the user's voice comprises the voice selection command, skip an instruction process and provide voice following the voice selection command to an external server for external analyzing and based on results of the external server analyzing of the voice, control the function executor to execute the predetermined function, and
   in response to the first determination that user's voice does not comprises the voice selection command, make a second determination whether the user's voice matches an instruction of the previously stored instructions, in response to the second determination indicating that the user's voice matches the instruction of the previously stored instructions, execute the instruction process in which the user's voice is processed internally within the electronic apparatus and the predetermined function is executed in accordance with the instruction, and in response to the second determination indicating that the user's voice does not match any of the previously stored instructions, provide the user's voice to the external server for external analyzing.

5. The electronic apparatus according to claim 4, wherein the voice recognizer sequentially receives the user's voice comprising the voice selection command and the voice which is contextual voice input for executing the predetermined function.

6. The electronic apparatus according to claim 4, wherein the storage is further configured to store history and record of the user's voice processed by the dialogue process.

7. The electronic apparatus according to claim 6, wherein the controller is further configured to switch frequently used instructions from the dialogue process to the instruction process and generating a notification to a user.

8. The electronic apparatus according to claim 4, wherein, in response to a voice command being repetitively input, the controller is configured to store, in the storage, a record of the voice command processed by the dialogue process, and
   wherein, in response to the controller determining that the user's voice corresponds to the voice command stored in the record, the controller executes the instruction process instead of the dialogue process.

9. A voice processing method of an electronic apparatus comprising a storage configured to have previously stored instructions, the method comprising:
   recognizing a user's voice;
   determining whether the user's voice comprises a voice selection command for using a dialogue process;
   in response to the determining that the user's voice comprises the voice selection command, skipping internal processing of the user's voice and providing voice following the voice selection command to an external server for processing the voice in the external server and based on results of the processing by the external server, executing a predetermined function; and
   in response to the determining that the user's voice does not comprise the voice selection command, further determining whether the user's voice matches an instruction from among the previously stored instructions, in response to the further determining indicating that the user's voice matches the instruction from among the previously stored instructions, performing the internal processing of the user's voice in the electronic apparatus and based on results of the internal processing, executing the predetermined function, and in response to the further determining indicating that the user's voice does not match any of the previously stored instructions, providing the user's voice to the external server for the processing.

10. The voice processing method according to claim 9, the method is further comprising:
   in response to a voice command being repetitively input, storing, in the storage, a record of the voice command processed by the dialogue process, and
   in response to the determining that the user's voice comprises the voice command stored in the record, executing the instruction process instead of the dialogue process.

11. An electronic apparatus comprising:
   a function executor configured to perform a predetermined function; and
   a controller configured to determine whether a user's voice comprises a voice selection command for using a dialogue process,
   wherein, in response to the controller determining that the user's voice comprises the voice selection command, the controller is further configured to skip an internal process of the user's voice and transmit voice following the voice selection command to an external server for external analyzing and based on results of the external server analyzing the voice, control the function executor to execute the predetermined function, and
   wherein, in response to the controller determining that the user's voice does not comprise the voice selection command, the controller is further configured to determine whether the user's voice matches an instruction from among a plurality of internally stored instructions, in response to the controller determining that the user's voice matches the instruction from among the internally stored instructions, process the user's voice internally within the electronic apparatus and control the function executor to execute the predetermined function corresponding to the instruction, and in response to the controller determining that the user's voice does not match any of the internally stored instructions, transmit the user's voice to the external server for the external analyzing.

12. The electronic apparatus of claim 11 further comprising: a voice recognizer configured to recognize the user's voice.

13. The electronic apparatus of claim 11, further comprising an internal memory configured to pre-store said internally stored instructions.

* * * * *